US009903762B2

(12) United States Patent
Schwarze et al.

(10) Patent No.: US 9,903,762 B2
(45) Date of Patent: Feb. 27, 2018

(54) PYROMETRIC DETECTION DEVICE, METHOD FOR CALIBRATING THE SAME, AND APPARATUS FOR PRODUCING THREE-DIMENSIONAL WORK PIECES

(71) Applicant: SLM Solutions Group AG, Luebeck (DE)

(72) Inventors: Dieter Schwarze, Luebeck (DE); Daniel Alberts, Luebeck (DE)

(73) Assignee: SLM Solutions Group AG, Luebeck (DE)

( * ) Notice: Subject to any disclaimer, the term of this patent is extended or adjusted under 35 U.S.C. 154(b) by 13 days.

(21) Appl. No.: 14/940,838

(22) Filed: Nov. 13, 2015

(65) Prior Publication Data
US 2016/0146671 A1    May 26, 2016

(30) Foreign Application Priority Data

Nov. 21, 2014    (EP) .................................... 14194378

(51) Int. Cl.
*G01J 5/08*    (2006.01)
*G01J 5/52*    (2006.01)
(Continued)

(52) U.S. Cl.
CPC ............ *G01J 5/0821* (2013.01); *B29C 64/20* (2017.08); *B29C 64/386* (2017.08); *B33Y 30/00* (2014.12);
(Continued)

(58) Field of Classification Search
CPC ....... G01J 2005/0048; G01J 2005/0051; G01J 2005/0055; G01J 2005/0059;
(Continued)

(56) References Cited

U.S. PATENT DOCUMENTS 5,156,461 A * 10/1992 Moslehi .................... G01J 5/00
250/338.1
5,762,419 A * 6/1998 Yam ....................... G01J 5/0003
374/2
(Continued)

FOREIGN PATENT DOCUMENTS

JP    2006502387 A    1/2006
JP     200653127 A    2/2006
(Continued)

OTHER PUBLICATIONS

European Patent Office, European Search Report issued in European Patent Application No. 14194378.7 dated May 20, 2015, 6 pp.
(Continued)

*Primary Examiner* — Gordon J Stock, Jr.
(74) *Attorney, Agent, or Firm* — Taft Stettinius & Hollister LLP

(57) ABSTRACT

A pyrometric detection device for use in an apparatus for producing three-dimensional work pieces comprises a pyrometric detecting unit (10) configured to receive thermal radiation emitted at different points of a detection plane in a detection direction and a calibration device (12) comprising a substrate (14) and a plurality of light guides (16) each having a first end (18) for coupling light into the light guide (16) and a second end (20) for emitting light from the light guide (16), the second end (20) being fixed to the substrate (14). The substrate (14) is adapted to be removably arranged relative to the pyrometric detecting unit (10) in such a manner that the second ends (20) of the plurality of light guides (16) are arranged in the detection plane and emit light in the detection direction, in a calibration state of the pyrometric detection device.

15 Claims, 4 Drawing Sheets

(51) Int. Cl.
  *B33Y 30/00* (2015.01)
  *G01J 5/00* (2006.01)
  *B33Y 50/02* (2015.01)
  *G01J 5/60* (2006.01)
  *B29C 64/386* (2017.01)
  *G01J 5/04* (2006.01)
  *B22F 3/105* (2006.01)
  *B29C 64/20* (2017.01)
  *B29C 64/153* (2017.01)

(52) U.S. Cl.
  CPC ............. *B33Y 50/02* (2014.12); *G01J 5/0003* (2013.01); *G01J 5/004* (2013.01); *G01J 5/047* (2013.01); *G01J 5/0809* (2013.01); *G01J 5/089* (2013.01); *G01J 5/0896* (2013.01); *G01J 5/522* (2013.01); *G01J 5/60* (2013.01); *G01J 5/602* (2013.01); *B22F 2003/1056* (2013.01); *B29C 64/153* (2017.08); *G01J 2005/0048* (2013.01); *Y02P 10/295* (2015.11)

(58) Field of Classification Search
  CPC .... G01J 2005/0062; G01J 5/00; G01J 5/0003; G01J 5/0007; G01J 5/0066; G01J 5/0096; G01J 5/02; G01J 5/0205; G01J 5/08; G01J 5/0803; G01J 5/0818; G01J 5/0821; G01J 5/085; G01J 5/089; G01J 5/0896; G01J 5/10; G01J 5/0809; G01J 5/522; G01J 5/004; G01J 5/602; G01J 5/60; G01J 5/047; B22F 2003/1056; B29C 67/0077; B29C 67/0085; B29C 67/0088; B29C 64/153; B29C 64/20; B29C 64/386; B33Y 30/00; B33Y 50/02; Y02P 10/295
  See application file for complete search history.

(56) References Cited

U.S. PATENT DOCUMENTS

| | | | |
|---|---|---|---|
| 6,179,465 | B1 | 1/2001 | Yam |
| 6,930,278 | B1 | 8/2005 | Chung et al. |
| 2003/0236642 | A1* | 12/2003 | Timans ................ G01J 5/0003 702/99 |
| 2010/0134628 | A1 | 6/2010 | Pfitzner et al. |

FOREIGN PATENT DOCUMENTS

| | | |
|---|---|---|
| JP | 200942248 A | 2/2009 |
| JP | 2010508534 A | 3/2010 |
| WO | 98/53286 A1 | 11/1998 |
| WO | 01/85386 A2 | 11/2001 |
| WO | 2004031752 A2 | 4/2004 |

OTHER PUBLICATIONS

Office Action, JP2015-210383, dated Oct. 18, 2016 including partial translation, 10 pages.

* cited by examiner

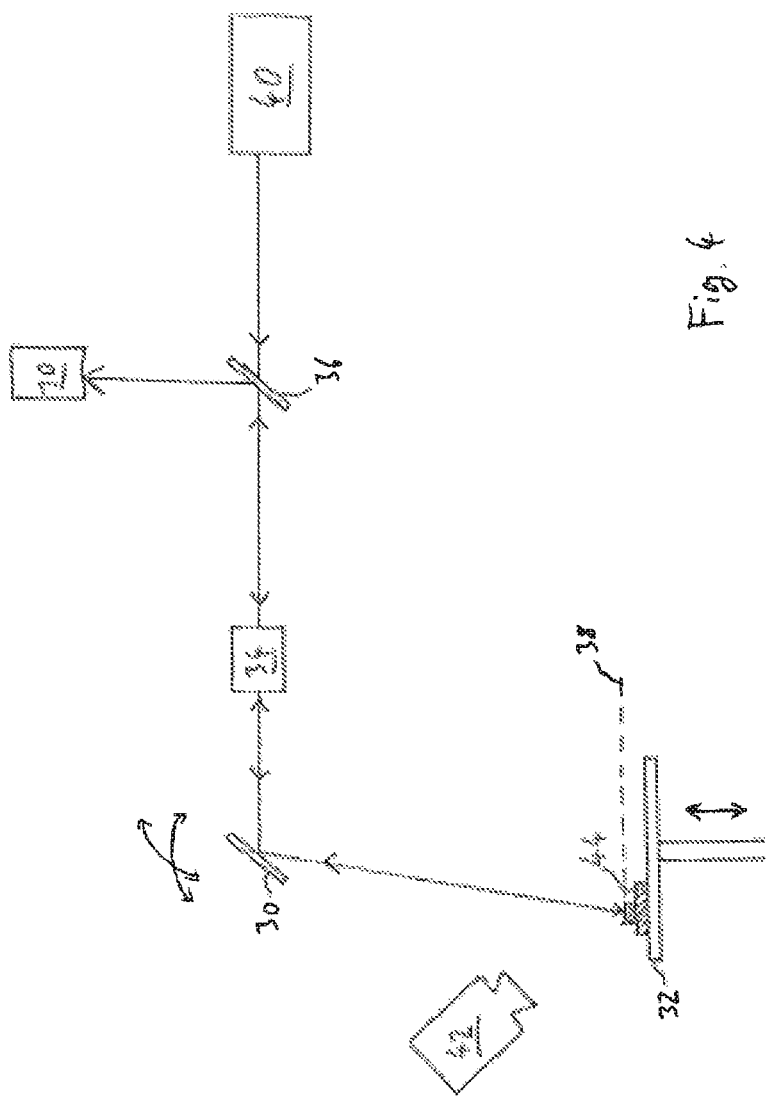

PYROMETRIC DETECTION DEVICE, METHOD FOR CALIBRATING THE SAME, AND APPARATUS FOR PRODUCING THREE-DIMENSIONAL WORK PIECES

The present invention relates to a pyrometric detection device and a method for calibrating the same. The present invention further relates to an apparatus for producing three-dimensional work pieces.

Powder bed fusion is an additive layering process by which pulverulent, in particular metallic and/or ceramic raw materials can be processed to three-dimensional work pieces of complex shapes. To that end, a raw material powder layer is applied onto a carrier and subjected to a laser radiation in a site selective manner in dependence on the desired geometry of the work piece that is to be produced. The laser radiation penetrating into the powder layer causes heating and consequently melting or sintering of the raw material powder particles. Further raw material powder layers are then applied successively to the layer on the carrier that has already been subjected to laser treatment, until the work piece has the desired shape and size. Powder bed fusion can be used in particular for the production of prototypes, tools, replacement parts or medical prostheses, such as, for example, dental or orthopaedic prostheses, on the basis of CAD data. Instead of laser irradiation, other electromagnetic or particle radiation, such as electron irradiation, might be used for melting or sintering of the raw material powder particles.

In order to obtain a work piece having desired physical properties, the melting or sintering conditions at the irradiation spot may be monitored during production by a monitoring device.

The invention is directed to the object of providing a pyrometric detection device and a method for calibrating the same, which allow a precise monitoring of a building process for generating a three-dimensional work piece by irradiating layers of raw material powder with electromagnetic or particle radiation. The invention is further directed to the object of providing an apparatus for producing three-dimensional work pieces.

The above object is achieved by a pyrometric detection device, an apparatus for producing three-dimensional work pieces, and a method for calibrating a pyrometric detection device as define in the claims.

According to a first aspect, a pyrometric detection device for use in an apparatus for producing three-dimensional work pieces comprises a pyrometric detecting unit configured to receive thermal radiation emitted at different points of a detection plane in a detection direction and a calibration device comprising a substrate and a plurality of light guides each having a first end for coupling light into the light guide and a second end for emitting light from the light guide, the second end being fixed to the substrate. The substrate is adapted to be removably arranged relative to the pyrometric detecting unit in such a manner that the second ends of the plurality of light guides are arranged in the detection plane and emit light in the detection direction, in a calibration state of the pyrometric detection device.

The pyrometric detecting unit may comprise an optical detector sensitive for electromagnetic radiation in a wavelength region corresponding to thermal radiation emitted by a laser melting or sintering spot. In particular, the pyrometric detecting unit may comprise at least two optical detectors for detecting thermal radiation at two different wavelength ranges, wherein optical filters (e.g., high-pass, low-pass or band-pass filters) or wavelength-dependent beam splitters may be used for directing an incoming light beam of thermal radiation in a desired wavelength range to the respective detectors. The thermal radiation may be in the infrared wavelength range and the optical detectors may be sensitive for thermal radiation in the infrared radiation range. The optical detector or the optical detectors of the pyrometric detecting unit may output an electrical signal depending on an irradiation intensity of thermal radiation in a certain wavelength range at the respective detector. An evaluation unit may be provided for calculating a temperature value based on the electrical signal(s) (e.g., based on a ratio of two electrical signals from two detectors detecting thermal radiation at two different wavelength ranges).

The plurality of light guides of the calibration device may be light guides for directing light (e.g., in the visible or infrared wavelength range) from a first end to a second end thereof by means of total internal reflection. The second ends of the plurality of light guides may be fixed to the substrate, such that an orientation of the second ends with respect to the substrate does not change with time.

The substrate is adapted to be removably arranged with respect to the pyrometric detecting unit, for example by manually arranging the substrate at a desired location or by using a motor or a robot arm for moving the substrate to a desired location. In the calibration state, the second ends of the plurality of light guides are arranged in the detection plane. The second ends may be light-emitting ends of the plurality of light guides and may be arranged substantially in a plane with respect to the substrate. In the calibration state, this plane corresponds to the detection plane of the pyrometric detecting unit. The light guides are adapted to emit light in the detection direction of the pyrometric detecting unit, such that the light emitted from the plurality of light guides may be detected by the pyrometric detecting unit in the calibration state. The calibration state of the pyrometric detection device may be a calibration state, in which the pyrometric detecting unit is calibrated in order to compensate for dependencies of the pyrometric detecting unit with regard to radiation emitted at different points (i.e., different locations) in the detection plane.

The substrate may be plate-shaped and the second ends of the plurality of light guides may be arranged in a plane corresponding to an upper side of the plate-shaped substrate. The substrate may be, e.g., a metal plate. In particular, the substrate may be a black anodized aluminium plate.

Each of the light guides may be directed through a through-hole in the substrate. For example, each one of the plurality of light guides may be directed through an individual through-hole. The plurality of light guides may be fixed to the substrate by means of the through-hole and/or by using fastening means (e.g., a glue or a resin). At least one of the through-holes may be provided in an oblique angle with respect to a surface of the substrate, such that a main light emission direction of the light guide directed through that through-hole is an oblique direction with respect to the surface of the substrate.

The second ends of the plurality of light guides may be fixed to the substrate such that a main light emission direction of each light guide corresponds to the detection direction of the pyrometric detecting unit, in the calibration state. The main light emission direction may correspond to a direction, in which the highest intensity of light is emitted from the corresponding light guide. In other words, in the calibration state, the second ends of each of the plurality of light guides may be oriented, such that a maximum of emitted light intensity from each one of the light guides is oriented in the detection direction of the pyrometric detecting unit.

The second ends of the plurality of light guides may be fixed to the substrate such that they are oriented in the detection direction of the pyrometric detecting unit, in the calibration state. In other words, the main light emission direction may correspond to a direction in which the light guide is oriented, i.e., a direction in which the second end of the corresponding light guide is oriented.

The second ends of the plurality of light guides may be arranged on the substrate in the form of a matrix. For example, a plurality of through-holes, through which the light guides are directed, may be arranged in the form a matrix. The matrix may be, e.g., an n times m matrix having n rows and m columns, wherein the rows are arranged parallel to each other and the columns are arranged parallel to each other. The rows and the columns may intersect each other at an angle of 90 degrees. At each intersection, a second end of one of the plurality of light guides may be arranged. The matrix may be an n times n matrix having the same amount of rows and columns. The distance between each pair of adjacent columns may be the same and the distance between each pair of adjacent rows may be the same. Further, the distance between adjacent columns may be the same as the distance between adjacent rows.

The pyrometric detection device may further comprise a light source adapted to couple light into each of the plurality of light guides via their first ends, wherein the intensity of the light coupled into each of the plurality of light guides is substantially the same. The light source may direct a light beam to each of the plurality of first ends, such that the same amount of light (the same intensity) is coupled into each one of the light guides. For example, a gas discharge lamp or a laser having a top-hat beam profile may be used as a light source. In case a laser is used, the laser may emit light having a wavelength which differs from the wavelength of the thermal radiation detected by the pyrometric detection unit.

The light guides may be glass fibers and the first ends of the plurality of light guides may be arranged next to each other in the form of a bundle. The bundle may be held together by means of a bundle sleeve. The bundle may be arranged such that each of the plurality of first ends is oriented in the same direction. A light source may be provided for illuminating the bundle, such that substantially the same intensity of light is coupled into each one of the plurality of light guides.

Each of the light guides may have the same length. Further, each of the light guides may have the same optical properties. The intensity of light coupled out of the second ends of each of the plurality of light guides may be the same.

According to a second aspect, an apparatus for producing three-dimensional work pieces comprises a carrier, a powder application device for applying a raw material powder onto the carrier, and an irradiation device for selectively irradiating electromagnetic or particle radiation onto the raw material powder applied onto the surface of the carrier. The apparatus further comprises the pyrometric detection device defined herein, wherein the detection plane of the pyrometric detection device corresponds to an irradiation plane defined on the carrier.

The apparatus may be an apparatus for powder bed fusion. The pyrometric detecting unit of the pyrometric detection device may be mounted on the apparatus and the substrate of the calibration device may be adapted to be removably arranged with respect to the apparatus. In the calibration state, the second ends of the plurality of light guides may be arranged in the irradiation plane of the apparatus. The irradiation plane may be defined on the carrier, such that the irradiation plane is a plane parallel to a surface plane of the carrier. During operation of the apparatus, when writing a first layer of a three-dimensional work piece, the irradiation plane may substantially correspond to a surface plane of the carrier.

In the calibration state, the substrate, the plurality of light guides, and the light source may be arranged inside a process chamber of the apparatus. The process chamber may be chamber which is adapted to be hermetically sealed. The process chamber may be evacuated before an operation state of the apparatus is initiated. Further, the chamber may be filled with a predefined gas, in particular an inert gas, during the operation state.

The irradiation device may comprise a laser source configured to emit a laser beam and an optical unit configured to direct the laser beam to predetermined points of the irradiation plane. The laser source may be an infrared laser source. The laser source may be adapted to emit a laser beam for melting or sintering a raw material powder. The optical unit may comprise a rotatable mirror. The rotatable mirror may be rotatable about at least two rotation axes, such that the laser beam may be directed to predetermined points in the two dimensions of the irradiation plane. Further, the optical unit may comprise other optical elements, e.g., at least one lens. A lens or a plurality of lenses may be provided for focusing the laser beam onto the irradiation plane. Further, movable lenses may be provided for narrowing or broadening an irradiation spot in the irradiation plane.

The optical unit may be configured to direct the thermal radiation emitted at the different points of the detection plane to the pyrometric detecting unit and the detection direction at each point of the detection plane may be opposite to an incidence direction of the laser beam. The thermal radiation at a point of the detection plane may be caused by laser melting of raw material powder at that point of the detection plane, wherein the detection plane corresponds to an irradiation plane of the apparatus. Further, in the calibration state, the optical unit may be configured to direct the light emitted from the second ends of the plurality of light guides to the pyrometric detecting unit. The optical unit may be configured to direct the laser light coming from the laser source to the irradiation plane (corresponding to the detection plane). An optical path of the laser beam and an optical path of thermal radiation detected by the pyrometric detecting unit may correspond to each other, at least in part.

According to a third aspect, a method for calibrating a pyrometric detection device for use in an apparatus for producing three-dimensional work pieces comprises removably arranging a calibration device relative to a pyrometric detecting unit configured to receive thermal radiation emitted at different points of a detection plane in a detection direction. The calibration device comprises a substrate and a plurality of light guides each having a first end for coupling light into the light guide and a second end for emitting light from the light guide, the second end being fixed to the substrate, wherein the second ends of the plurality of light guides are arranged in the detection plane. The method further comprises coupling light into each of the plurality of light guides via the first ends, individually measuring the intensity of light emitted from each of the second ends of the plurality of light guides in the detection direction by means of the pyrometric detecting unit, and calibrating the pyrometric detecting unit based on the results of the intensity measurements.

The results of the intensity measurements may be saved in a memory of the apparatus. The step of calibrating may be carried out by a computer. Further steps of method may also be carried out automatically by a controller of the apparatus.

The intensity of the light coupled into each of the plurality of light guides may be substantially the same. For example, a light source may be used for irradiating each one of the first ends of the light guides with a constant light intensity.

Preferred embodiments of the invention now are described in greater detail with reference to the appended schematic drawings, wherein FIG. 1 shows a schematic perspective view of a pyrometric detection device for use in an apparatus for producing three-dimensional work pieces;

FIG. 4 shows a schematic side view of an apparatus for producing three-dimensional work pieces in the operation state.

Figure 1:
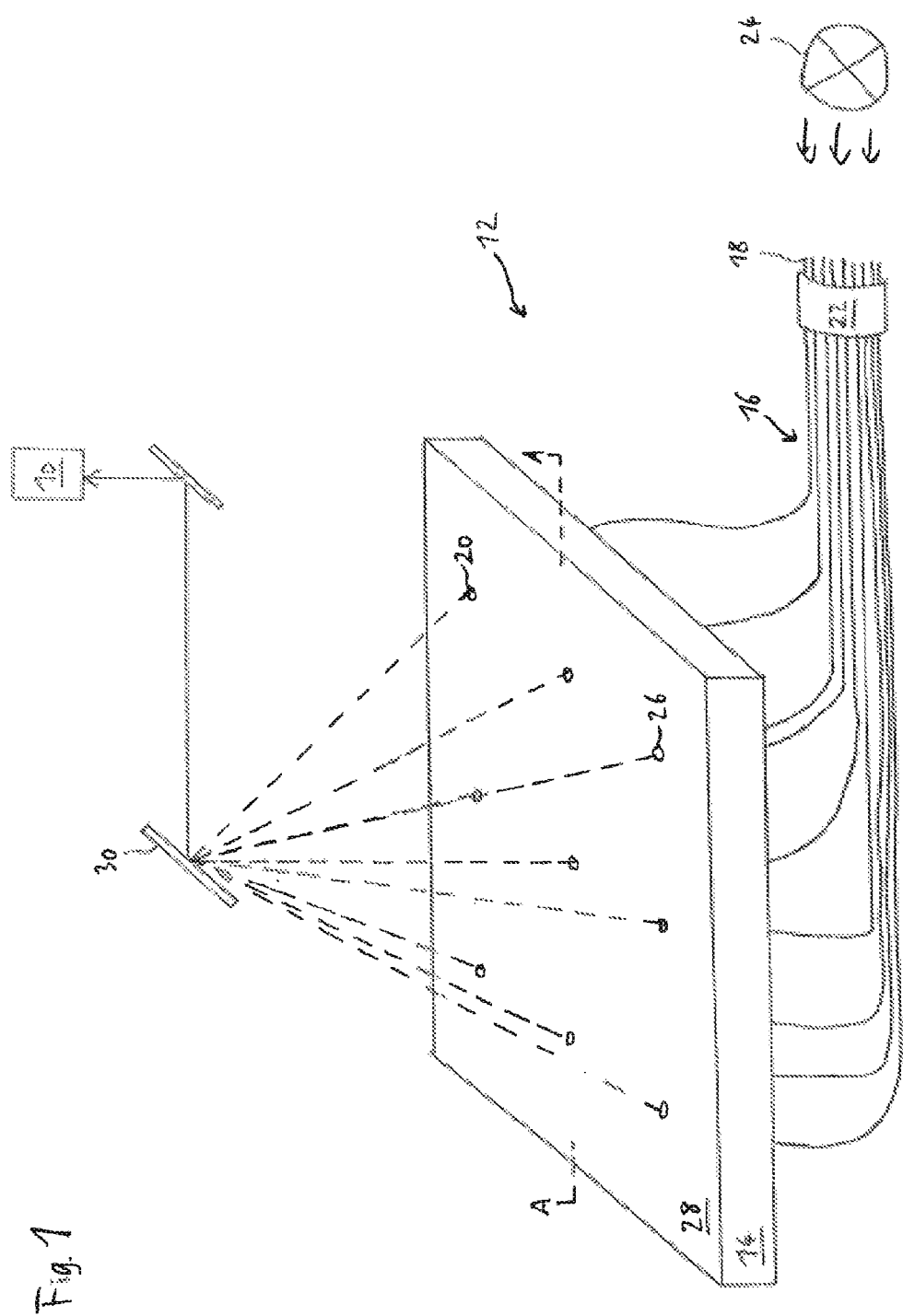

FIG. 1 shows a schematic perspective view of a pyrometric detection device according to an embodiment of the present invention. The pyrometric detection device comprises a pyrometric detecting unit 10 configured to receive thermal radiation. The thermal radiation may be electromagnetic radiation in an optical and/or the infrared wavelength range having an intensity maximum at a specific wavelength depending on the temperature at the emission spot (according to the principles of black body radiation). The pyrometric detecting unit 10 is further configured to detect the thermal radiation, to generate an electrical signal depending on the thermal radiation, and to output a value indicating a temperature at an emission spot of the thermal radiation.

For example, the pyrometric detecting unit 10 may comprise a first optical sensor and a second optical sensor (not shown in FIG. 1). Each one of the first and second optical sensors is configured to output an electrical signal depending on an intensity of detected thermal radiation in a specific wavelength range. Optical filters and/or wavelength-dependent beam splitters may be used in order to direct the incoming thermal radiation of the desired wavelength range to the respective detector. A value indicating the temperature at the emission spot may be calculated by considering a ratio between the electrical signal of the first optical detector and the electrical signal of the second optical detector.

The pyrometric detection device further comprises a calibration device 12. The calibration device 12 comprises a substrate 14. In the embodiment of FIG. 1, the substrate is plate-shaped. The substrate may be formed of metal, e.g. of aluminum (in particular, black anodized aluminum in order to absorb light). The calibration device 12 further comprises a plurality of light guides 16. The light guides 16 may be optical fibers (glass fibers) or any other kind of light guides 16 configured to direct light of a certain wavelength from a first end thereof to a second end thereof, e.g., by means of total internal reflection. Each one of the plurality of light guides 16 has a first end 18 and a second end 20. As shown in FIG. 1, the first ends 18 of the plurality of light guides 16 may be arranged in the form of a bundle. The bundle may be held together by a bundle sleeve 22.

A light source 24 is provided for emitting light of a wavelength range (e.g., visible and/or infrared), which comprises components detectable by the pyrometric detecting unit 10. Thus, the light emitted by the light source 24 may be used for calibrating the pyrometric detection device.

Further optical elements like mirrors, beam splitters, and/or lenses (not shown) may be provided for directing the light emitted by the light source 24 to the first ends 18 of the plurality of light guides 16. Light emitted by the light source 24 is coupled into the light guides 16 via their first ends 18. The light source 24 and the first ends 18 are arranged such, that the intensity of light coupled into each one of the light guides 16 is substantially the same. As light source 24, e.g., a gas discharge lamp or a laser with a (widened) top-hat beam profile may be used.

Alternatively, a plurality of light sources may be provided for emitting light of a constant intensity to the first ends 18 of the light guides 16, such that the intensity of the light coupled into each one of the light guides 16 is substantially the same.

Each one of the second ends 20 of the plurality of light guides 16 is fixed to the substrate 14, such that a position of the respective second end 20 and an orientation of the respective second end 20 with respect to the substrate 14 do not change with time. For example, parts of the light guides close to their second ends 20 may be glued or otherwise mechanically attached to the substrate 14. As shown in FIG. 1, the plurality of light guides 16 may be directed through through-holes 26 provided in the substrate. For each one of the second ends 20, a corresponding through-hole 26 may be provided, through which the respective light guide 16 is directed. The light guides 16 may be fixed to the substrate 14 by fastening means provided in the through-holes 26 (e.g., a glue or a resin).

The second ends 20 of the plurality of light guides 16 are provided such that they are provided substantially in a common plane. In the embodiment shown in FIG. 1, this plane corresponds to a surface plane 28 of the substrate 14. However, in other embodiments, this plane may correspond, e.g., to a plane parallel to the surface plane 28 above or inside the substrate 14. For example, if the second ends 20 are arranged in a plane parallel to the surface plane 28 and inside the substrate 14, side walls of the through holes 26 may be used for blocking light emitted at undesired directions not corresponding to a main light emission direction of the respective light guide 16.

The plane, in which the plurality of second ends 20 are arranged, corresponds to a detection plane of the pyrometric detecting unit 10. The pyrometric detecting unit 10 is configured to receive thermal radiation emitted at different points in the detection plane. A light directing unit 30 may be provided for directing light emitted at predetermined points of the detection plane to the pyrometric detecting unit 10. The light directing unit 30 may comprise, e.g., a rotatable mirror having two rotation axes or a plurality of rotatable mirrors. The light directing unit 30 may be electrically controllable such that light (thermal radiation) emitted at a specific predetermined point of the detection plane is directed to the pyrometric detecting unit 10.

When the light is coupled from the light source 24 into the plurality of light guides 16, light is emitted from the second ends 20 of the plurality of light guides 16. Each one of the plurality of light guides 16 may have substantially the same length. Further, each one of the plurality of light guides 16 may have the same optical properties, such that a ratio between an intensity coupled into the light guide 16 and an intensity emitted from the light guide 16 is the same for each one of the light guides 16. If the same light intensity is coupled into the plurality of light guides 16 via their first ends 18, the intensity of light emitted from each one of the second ends 20 may also be the same for each one of the plurality of light guides 16.

Each one of the plurality of light guides 16 has a main light emission direction. The main light emission direction corresponds to a direction in which a maximum of light intensity is emitted via the second end 20 of the respective light guide 16. For example, the main light emission direction may correspond to a direction in which the light guide 16 is oriented at its second end 20. In other words, the main light emission direction may correspond to an extension direction of the light guide 16 at its second end 20. The main light emission direction of a light guide 16 may correspond to a direction in which the second end 20 of the respective light guide 16 faces.

However, each of the plurality of light guides 16 may not only emit light into its main light emission direction but also into a full half space. The second ends 20 of the plurality of light guides 16 are arranged in the detection plane such that they emit light in the detection direction of the pyrometric detecting unit 10. As shown in the embodiment of FIG. 1, the plurality of light guides 16 may be arranged, such that the main light emission direction (indicated by a dashed line) corresponds to the light detection direction of the pyrometric detecting unit 10. For example, the main light emission direction of each one of the plurality of light guides 16 may be directed to the light directing unit 30. As explained above, the light directing unit 30 (comprising, e.g., a rotatable mirror) directs the thermal radiation (and/or the light) emitted at predetermined points of the detection plane to the pyrometric detecting unit 10. Depending on an orientation state of the light directing unit 30, light emitted from a predetermined one of the second ends 20 may be directed to the pyrometric detecting unit 10.

As shown in FIG. 1, the second ends 20 of the plurality of light guides 16 may be arranged in a matrix. Exemplarily, a 3 times 3 matrix is shown in FIG. 1. However, any n times m matrix may be used having n rows and m columns. As shown in FIG. 1, the total number of light guides 16 is 9 (3 times 3). The total number of light guides may be increased (e.g., to 16, 25, 36, 49, or any other arbitrary number) in order to increase a calibration accuracy of the pyrometric detection device. The arrangement of the second ends 20 with respect to the substrate 14 is not limited to a matrix and any other two-dimensional arrangement may be used as long as the second ends 20 are provided in a common plane.

Further, the shape of the substrate is not limited to a plate-shaped substrate. Any other shape may be used (e.g., a grid or a box).

As shown in FIG. 1, in a calibration state of the pyrometric detection device, the calibration device 12 is positioned in the manner described above. However, the pyrometric detection device might be operated in different states, in which the calibration device 12 is removed, e.g., as described later with respect to FIG. 4.

Figure 2:
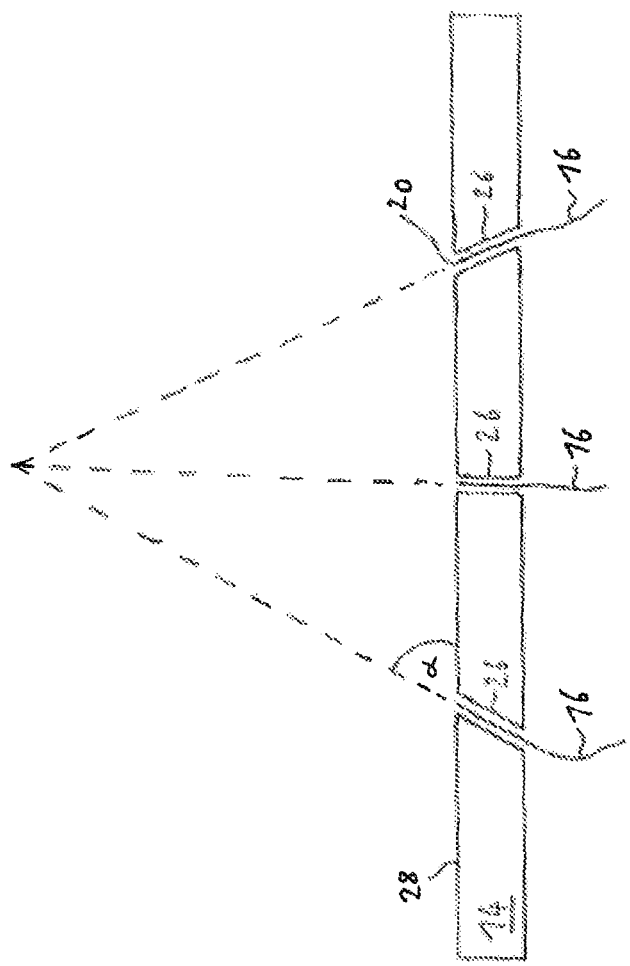
FIG. 2 shows a schematic cross section of the pyrometric detection device along the line A-A of FIG. 1.

FIG. 2 shows a schematic cross section of an embodiment of a pyrometric detection device, the cross section being taken along the line A-A of FIG. 1. Each one of the plurality of light guides 16 is directed through a corresponding through-hole 26, such that each one of the second ends 20 is substantially arranged in the surface plane 28 of the substrate 14. As described above, alternatively, the second ends 20 may be arranged in a plane above or below the surface plane 28. At least one of the through-holes 26 is provided in an oblique angle α with respect to the plane in which the second ends 20 are arranged, which corresponds to the detection plane of the pyrometric detecting unit 10. By providing oblique through-holes 26, an orientation of the light guide 16 directed through the through hole 26 may be determined. Thus, a main light emission direction may be determined (as indicated by the dashed lines in FIG. 2). As shown in FIG. 2, the light guides 16 are provided such that they emit light via their respective second ends 20 in the detection direction. More specifically, the plurality of light guides 16 may be arranged, such that a main light emission direction of each one of the light guides 16 corresponds to a light detection direction of the pyrometric detecting unit 10.

Figure 3:
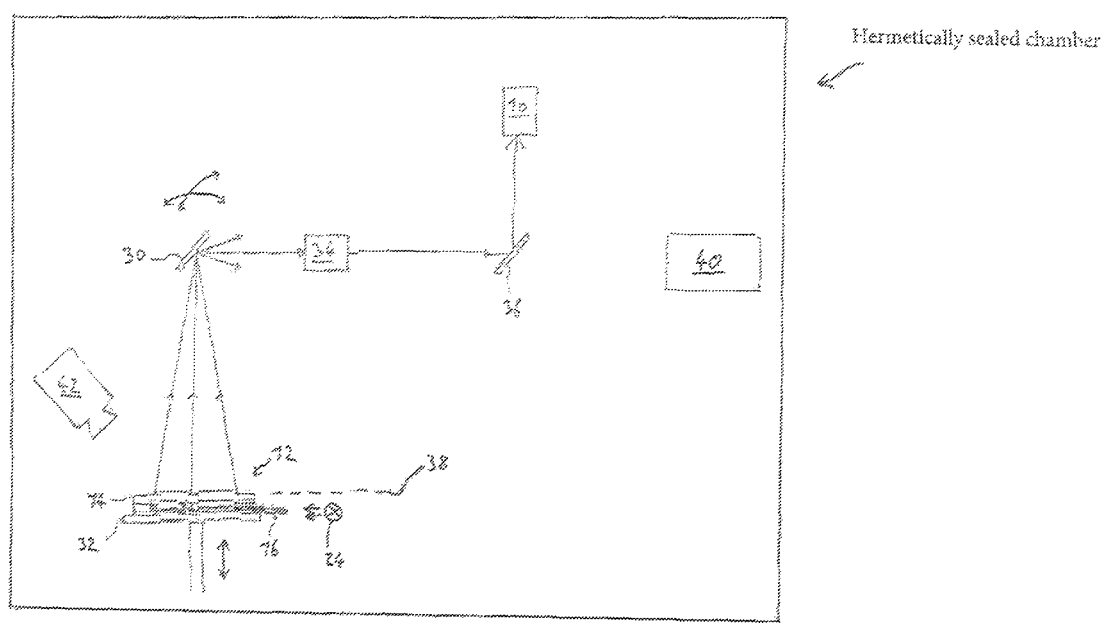
FIG. 3 shows a schematic side view of an apparatus for producing three-dimensional work pieces in the calibration state.

FIG. 3 shows a schematic side view of an apparatus for producing three-dimensional work pieces in the calibration state. Features of the apparatus having the same reference signs as used in the description of FIG. 1 or FIG. 2 above correspond to the same or similar features. A description of these features therefore may be omitted.

FIG. 3 shows a schematic side view of a part of an apparatus for producing three-dimensional work pieces. The apparatus may be, e.g., an apparatus for powder bed fusion. The apparatus comprises a carrier 32 having a surface plane. In an operation state of the apparatus (see description of FIG. 4 below), a three-dimensional work piece 44 is built on the carrier 32. However, in the calibration state shown in FIG. 3, a calibration device 12 is positioned on the carrier 32. The calibration device 12 may be, e.g., the calibration device 12 described above with reference to FIGS. 1 and 2.

In the calibration state, the first ends 18 of the plurality of light guides 16 are illuminated with light from the light source 24, such that light having the same intensity is emitted from each one of the second ends 20 towards the light directing unit 30. The second ends 20 of the plurality of light guides 16 are arranged in the detection plane 38 of the pyrometric detecting unit 10. As shown in FIG. 3, the detection plane 38 may be defined by a surface plane of the substrate 14. The detection plane is a plane parallel to a surface plane of the carrier 32.

An orientation of the light directing unit 30 is electrically controlled, such that at one time substantially only light emitted from one of the plurality of light guides 16 is directed in the direction of the pyrometric detecting device 10. An optical unit 34 may be provided between the light directing unit 30 and the pyrometric detecting unit 10. Further, a second optical unit (not shown) may be provided between the light directing unit 30 and the detection plane 38. The optical unit 34 may also be omitted and only the second optical unit may be provided. The optical unit(s) may be configured to focus the thermal radiation (the light) emitted at a certain point (or a certain small area) in the detection plane 38 to the pyrometric detecting unit 10. Thus, a focal spot in the detection plane 38 may be adjusted. The focal spot may be adjusted, e.g., such that substantially only the light emitted from one of the plurality of light guides 16 is directed to the pyrometric detecting unit 10.

Further, a beam splitter 36 (e.g., a semi-transparent mirror) is provided for directing to the light emitted from the light guides 16 to the pyrometric detecting unit 10. The semi-beam splitter 36 may be wavelength-dependent, such that preferably thermal radiation (light in a wavelength region of thermal radiation) is reflected towards the pyrometric detecting unit 10.

In the calibration state, the pyrometric detecting unit 10 detects light emitted from one of the plurality of second ends 20 arranged in the detection plane 38. During calibration, the orientation of the light directing unit 30 is changed, such that at a predetermined time, the light emitted from one predetermined light guide 16 arranged at a predetermined position in the detection plane 38 is detected by the pyrometric detecting unit 10. For example, at a time $t_1$ the light emitted by a light guide 16, the second end 20 of which is positioned at a location $X_1$, $Y_1$, may be detected. For example, at a time $t_2$ the light emitted by a light guide 16, the second end 20 of which is positioned at a location $X_2$, $Y_2$ different from the location $X_1$, $Y_1$, may be detected. Thus, a detection spot of the pyrometric detecting unit 10 is scanned over the detection plane 38. For each of the positions $X_n$, $Y_m$, at least one corresponding intensity value detected by the pyrometric detecting unit 10 is measured.

Due to angle and/or location dependencies of the light directing unit 30 and/or the pyrometric detecting unit 10, the measured values may differ even though a light intensity emitted from each one of the plurality of light guides 16 is substantially the same. By comparing the different measured values, the pyrometric detection device may be calibrated and angle and/or location dependencies may be compensated. Thus, an intensity value corresponding to the actual emitted intensity at a location $X_n$, $Y_m$ in the detection plane 38 may be measured by the pyrometric detecting unit 10.

The apparatus further comprises a powder application device 42 for applying a raw material powder onto the carrier 32. The apparatus further comprises an irradiation device 40 for selectively irradiating electromagnetic or particle radiation onto the raw material powder applied onto the surface of the carrier 32. In the embodiment shown in FIG. 3, the irradiation device 40 is a laser 40 emitting light of a wavelength and an intensity adapted to melt the raw material powder at a predetermined melting spot. In the calibration state shown in FIG. 3, the laser 40 may be turned off or blocked, such that no laser radiation is directed towards the carrier 32.

The substrate 14, the plurality of light guides 16, and the light source 24 may be arranged in a hermetically sealed chamber (a construction chamber) of the apparatus. Further, a cover may be provided below the substrate 14 in order to cover the light source 24 and the first ends 18 of the plurality of light guides 16, such that no undesired light is emitted into the chamber.

FIG. 4 shows a schematic side view of the apparatus of FIG. 3 in the operation state. In the operation state, a three-dimensional work piece 44 is built on the carrier 32. Hence, the calibration device 12 is removed from the carrier 32 in the operation state. In the operation state, a first layer of raw material powder is applied by the powder application device 42 onto the carrier 32. At the time of writing the first layer, the detection layer of the pyrometric detecting unit 10 substantially corresponds to the surface plane of the carrier 32.

At the time of writing the first layer, the laser 40 selectively irradiates laser radiation to an irradiation spot in an irradiation plane. Therefore, a laser beam is emitted by the laser 40 and passes through the beam splitter 36. The laser beam is focused by the optical unit 34 and directed to a predetermined irradiation spot in the irradiation plane by the light directing unit 30.

At the same time, the pyrometric detecting unit 10 detects thermal radiation emitted from the irradiating spot. Thus, the irradiation plane corresponds to the detection plane 38 defined on the carrier 32. The optical unit 34 (or the optical unit 34 in combination with another optical unit) may be adapted to change a spot diameter of the laser irradiation. Further, the spot diameter of the laser irradiation may be controllable independently from the detection diameter of the pyrometric detecting unit 10. Therefore, respective optical units may be provided.

After the first layer of the three-dimensional work piece 44 is entirely written, the carrier 32 moves downwards (indicated by an arrow in FIG. 4) and a second layer of powder is applied by the powder application device 42. Then, a second layer of the three-dimensional work piece 44 is written by the laser 40. During the writing process the temperature at the irradiation spot (melting spot) is monitored by the pyrometric detecting unit 10. Due to the calibration method described with reference to FIG. 3, the pyrometric detecting unit 10 may output a reliably temperature value for each position of the irradiation spot on the detection plane 38. Based on the temperature value, an intensity and/or a spot size of the laser beam may be adjusted.

The invention claimed is:

1. A pyrometric detection device comprising:
a pyrometric detecting unit configured to receive thermal radiation emitted at different points of a detection plane in a detection direction, and
a calibration device comprising a substrate and a plurality of light guides, each light guide having a first end for coupling light into the light guide and a second end for emitting light from the light guide, the second end being fixed to the substrate, wherein
the substrate is adapted to be removably arranged relative to the pyrometric detecting unit in such a manner that the second ends of the plurality of light guides are arranged in the detection plane and emit light in the detection direction, in a calibration state of the pyrometric detection device.

2. The pyrometric detection device according to claim 1, wherein
the substrate is plate-shaped; and
the second ends of the plurality of light guides are arranged in a plane corresponding to an upper surface of the plate-shaped substrate.

3. The pyrometric detection device according to claim 1, wherein
each of the light guides is directed through a through-hole in the substrate.

4. The pyrometric detection device according to claim 1, wherein
the second ends of the plurality of light guides are fixed to the substrate such that a main light emission direction of each light guide corresponds to the detection direction of the pyrometric detecting unit, in the calibration state.

5. The pyrometric detection device according to claim 4, wherein
the second ends of the plurality of light guides are fixed to the substrate such that they are oriented in the detection direction of the pyrometric detecting unit, in the calibration state.

6. The pyrometric detection device according to claim 1, wherein
the second ends of the plurality of light guides are arranged on the substrate in the form of a matrix.

7. The pyrometric detection device according to claim 1, further comprising
a light source adapted to couple light into each of the plurality of light guides via their first ends, wherein the intensity of the light coupled into each of the plurality of light guides is substantially the same.

8. The pyrometric detection device according to claim 1, wherein
the light guides are glass fibers; and
the first ends of the plurality of light guides are arranged next to each other in the form of a bundle.

9. The pyrometric detection device according to claim 1, wherein each of the light guides has the same length.

10. An apparatus comprising:

a carrier;

a powder applicator for applying a raw material powder onto the carrier;

an irradiator for selectively irradiating electromagnetic or particle radiation onto the raw material powder applied onto the surface of the carrier; and a pyrometric detection device comprising:

a pyrometric detector configured to receive thermal radiation emitted at different points of a detection plane in a detection direction; and a calibration device comprising a substrate and a plurality of light guides, each light guide having a first end for coupling light into the light guide and a second end for emitting light from the light guide, the second end being fixed to the substrate, wherein the substrate is adapted to be removably arranged relative to the pyrometric detector in such a manner that the second ends of the plurality of light guides are arranged in the detection plane and emit light in the detection direction, in a calibration state of the pyrometric detection device; and wherein the detection plane of the pyrometric detection device corresponds to an irradiation plane defined on the carrier.

11. The apparatus according to claim 10, wherein the pyrometric detection device further comprises:

a light source adapted to couple light into each of the plurality of light guides via their first ends, wherein the intensity of the light coupled into each of the plurality of light guides is substantially the same; and in the calibration state, the substrate, the plurality of light guides, and the light source are arranged inside a hermetically sealed chamber of the apparatus.

12. The apparatus according to claim 10, wherein the irradiator comprises a laser source configured to emit a laser beam and a light directing unit configured to direct the laser beam to predetermined points of the irradiation plane.

13. The apparatus according to claim 12, wherein the light directing unit is configured to direct the thermal radiation emitted at the different points of the detection plane to the pyrometric detector; and the detection direction at each point of the detection plane is opposite to an incidence direction of the laser beam.

14. A method for calibrating a pyrometric detection device for use in producing three-dimensional work pieces, the method comprising:

removably arranging a calibration device relative to a pyrometric detecting unit configured to receive thermal radiation emitted at different points of a detection plane in a detection direction, the calibration device comprising a substrate and a plurality of light guides, each light guide having a first end for coupling light into the light guide and a second end for emitting light from the light guide, the second end being fixed to the substrate, wherein the second ends of the plurality of light guides are arranged in the detection plane;

coupling light into each of the plurality of light guides via the first ends;

individually measuring the intensity of light emitted from each of the second ends of the plurality of light guides in the detection direction by means of the pyrometric detecting unit; and calibrating the pyrometric detecting unit based on the results of the intensity measurements.

15. The method according to claim 14, wherein the intensity of the light coupled into each of the plurality of light guides is substantially the same.

* * * * *